APPARATUS FOR PROCESSING MOLTEN METAL IN A VACUUM

Original Filed May 7, 1969 4 Sheets-Sheet 1

APPARATUS FOR PROCESSING MOLTEN METAL IN A VACUUM

Original Filed May 7, 1969 4 Sheets-Sheet 2

APPARATUS FOR PROCESSING MOLTEN METAL IN A VACUUM

Original Filed May 7, 1969 4 Sheets-Sheet 3

APPARATUS FOR PROCESSING MOLTEN METAL IN A VACUUM

Original Filed May 7, 1969 4 Sheets-Sheet 4

United States Patent Office

Re. 27,945
Reissued Mar. 26, 1974

27,945
APPARATUS FOR PROCESSING MOLTEN METAL IN A VACUUM

Charles d'A. Hunt, Moraga, Calif., and Reese R. de Haven, Jr., Media, Pa., assignors to Airco, Inc., New York, N.Y.

Original No. 3,658,119, dated Apr. 25, 1972, Ser. No. 824,030, May 7, 1969. Application for reissue Oct. 18, 1972, Ser. No. 298,462
Int. Cl. B22d *11/10, 27/02, 27/16*
U.S. Cl. 164—250 11 Claims

Matter enclosed in heavy brackets [ ] appears in the original patent but forms no part of this reissue specification; matter printed in italics indicates the additions made by reissue.

ABSTRACT OF THE DISCLOSURE

A method and apparatus are described for producing a solidified metal product. Molten metal is heated in a refractory crucible within a vacuum enclosure. The contents of the crucible are poured across a cooled transfer structure while being simultaneously heated with an electron beam. The metal leaving the transfer structure is then solidified to form the metal product.

This invention relates generally to melting and casting and, more particularly, to an improved method and apparatus for producing a solidified metal product. [This application is a continuation-in-part of application Ser. No. 718,586 filed Apr. 3, 1968 (now abandoned), and assigned to the assignee of the present invention.]

Vacuum induction processing of metal is a useful step in the manufacture of certain solidified metal products, such as castings, ingots, and particles, where a high level of purity is to be maintained. By carrying out operations in a vacuum, the production of oxide slag and the reaction of constituents in the molten metal with the atmosphere, are minimized.

Vacuum induction processing generally involves the utilization of a refractory material crucible in which the molten metal is contained. The molten metal may be placed in the crucible in a molten condition, or may be melted in the crucible. The crucible is surrounded by an induction coil to which current is supplied for heating the metal in the crucible. The term "heating" as used herein is intended to include melting as well as merely maintaining molten. Once a desired temperature has been reached in the molten metal, the molten metal is poured into a solidifying means such as a continuous casting mold or ordinary casting mold, or over splash plates (for producing particles).

In order to properly transfer the molten metal from the crucible into a mold or over splash plates, transfer structures are utilized. Such transfer structures may consist of ladles, launders or tundishes, or a combination of several of these, for conducting the molten metal from the crucible to the solidifying means. Heretofore, such transfer structures have generally been constructed with liners of refractory material. Where molten metal flows across parts of the refractory material, erosion of the refractory material occurs, frequently necessitating replacement. Erosion of refractory material may also result from high temperatures or frothing in the molten material. Frequent replacement of refractory material liners in transfer structures may be costly, both as to the cost of material and labor, and as to the cost of manufacturing (because of excessive down time). In large scale teeming of ingots, and similar operations, many ladles, launders and tundishes may be used. Reduction of erosion in such cases can effect a substantial cost saving.

In particular types of operations, vacuum induction heating may not preserve a desired degree of purity. This is because a certain amount of the refractory material of transfer structures or of the crucible itself may dissolve in the melt to a sufficient degree to contaminate the melt. Furthermore, the nature of known types of vacuum induction heating equipment does not usually cause a large improvement in purity (e.g., nitrogen content may be reduced no more than about 25 percent in typical commercial apparatus). Even where only a negligible amount of refractory material dissolves in the melt, the heat is not significantly higher in quality than a good grade of non-vacuum processed material. This is because the molten metal is not normally exposed to the vacuum in amounts such that a significantt quantity of volatile impuritiesc in the melt are drawn off. Because of such difficulties, some types of operations requiring very high purity have heretofore been unable to take advantage of the large scale production efficiencies achievable with induction melting.

It is an object of this invention to provide an improved method and apparatus for producing solidified metal products.

Another object of the invention is to provide a crucible heating type vacuum processing method and apparatus wherein excessive erosion of transfer structures is prevented.

Still another object of the invention is to provide a crucible heating type vacuum processing method and apparatus in which a relatively higher degree of purity is attainable than with heretofore known types of such methods and apparatus.

Other objects of the invention will become apparent to those skilled in the art from the following description taken in connection with the accompanying drawings wherein.

Very generally, the method and apparatus of the invention include heating molten metal in a vacuum. A cooled transfer structure is provided for conveying the molten metal to solidifying means while causing a skull to form between the molten metal and the transfer structure. At least one electron beam gun is provided for heating the molten metal while it is moving across the transfer structure.

Figure 1:
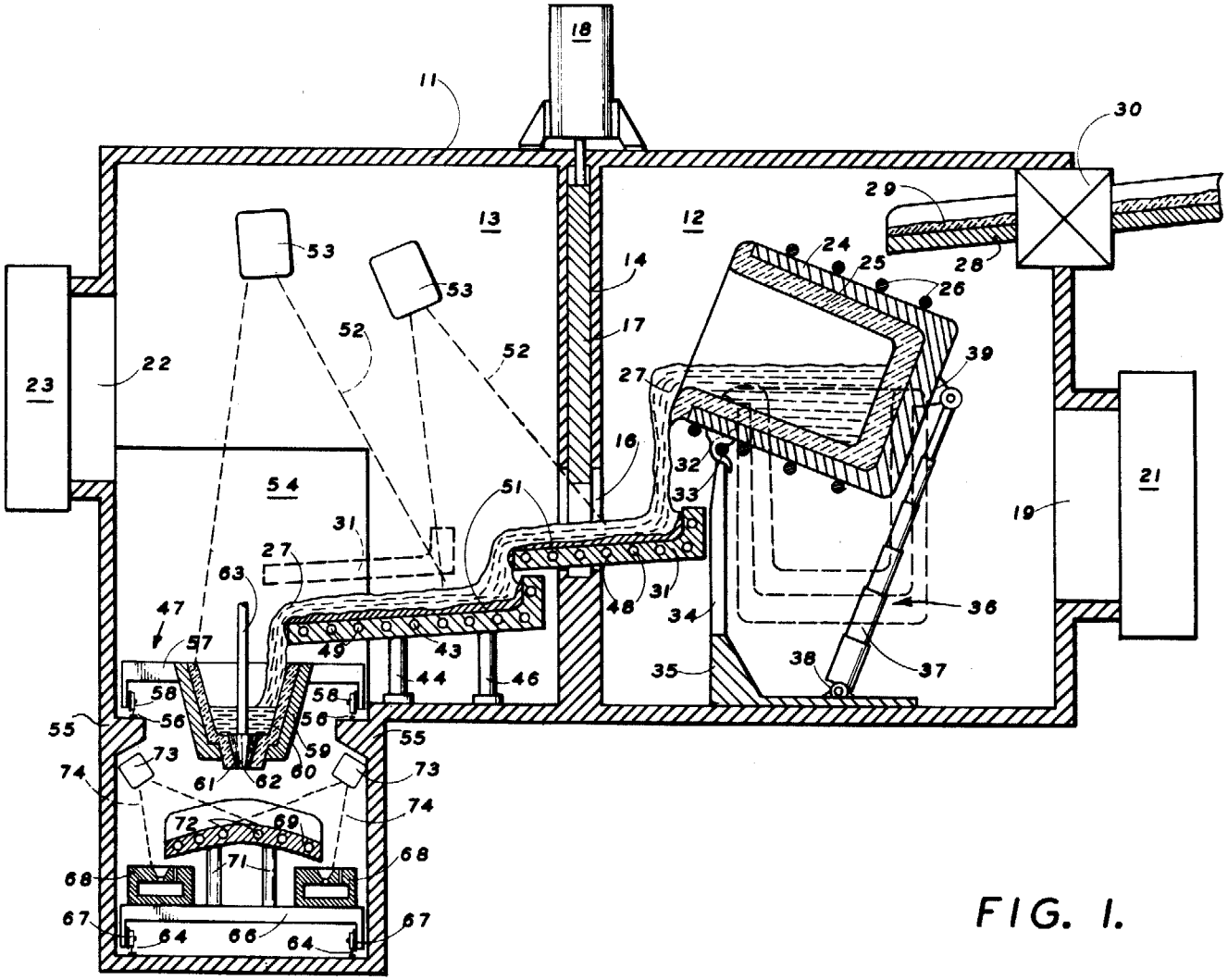
FIG. 1 is a schematic side view, partially in section, of apparatus embodying the invention.

The method of the invention will be best understood in connection with a description of apparatus embodying the invention. Referring now particularly to FIG. 1, the apparatus of the invention includes a vacuum enclosure 11. The enclosure 11 is divided into two regions 12 and 13 by a wall 14 having a port 16 therein. Heating, pouring and solidification of molten metal is carried out within the enclosure 11. A gate valve 17, operable by a hydraulic unit 18 mounted exteriorly of the chamber, is provided for selectively opening and closing the port 16. When the valve 17 is closed, the regions 12 and 13 are vacuum sealed from each other.

The region 12 is evacuated through a duct 19 by means of a suitable vacuum pump 21. The region 13 is evacuated through a duct 22 by means of a suitable vacuum pump 23. The two regions of the vacuum enclosure may thereby be maintained at different pressures and may be separately pumped down, providing the gate valve 17 is closed. As will be described in greater detail subsequently, the degree to which the regions 12 and 13 of the enclosure 11 are evacuated depends upon particular steps in operating the apparatus of the invention.

The molten metal of which the solid metal product is to be made is contained within a crucible 24 having a liner 25 of a suitable refractory material. An induction coil 26 surrounds the crucible 24 and means, not illustrated, are provided for conducting a current through the coil. The current is selected to be such as to provide induction heating of the material in the crucible, as is known in the art.

The molten metal 27 may be placed in the crucible 24 in any suitable manner. The particular means illustrated for accomplishing this comprise a launder 28 having a refractory material liner 29 and passing through a suitable vacuum valve 30 in the wall of the enclosure 11. The metal is passed into the crucible 24 when the crucible is in its upright position, below the lower end of the launder 28, indicated in phantom in FIG. 1. The material which is fed into the crucible 24 may be passed into the crucible in molten form and may flow along the launder 28 by gravity. Alternatively, depending upon the particular requirements of the system, the metal may be placed in the crucible 24 in solid form and heated in the crucible to a sufficient degree to melt the metal. In the former case, the metal is heated in the crucible 24 merely to maintain it in its molten condition until ready for pouring.

Once a desired quantity of molten metal is contained within the crucible 24, it is poured out of the crucible onto a transfer structure or launder 31. The crucible is pivotally supported below its pouring lip by a pivot hook 32 secured to and extending from the outer wall of the crucible. The pivot hook rests on a horizontal support bar 33 which extends between two uprights 34 of a frame 35. Movement of the crucible 24 from its upright position, indicated in phantom, to a position for pouring, as indicated in solid lines in the FIG. 1, is accomplished by an actuating mechanism 36. The actuating mechanism, which is supported on the frame 35, is shown in the illustrated embodiment as comprising an extensible hydraulic lift 37 pivotally supported between a support bracket 38 on the frame 35 and a support bracket 39 on the bottom of the crucible. With the lift 37 extended as shown, the crucible is tipped for pouring. When the lift is fully telescoped, the crucible is upright for heating. As an alternative to the hydraulic lift 37, the tipping may be accomplished by a suitable chain hoist system, not shown, as is known in the art.

The launder 31 directs the molten metal 27 from the region 12 of the enclosure 11 to region 13 through the port 16. The launder 31 discharges into a second launder 43 which is supported on posts 44 and 46 from the floor of the enclosure 11. The launder 43 carries the molten material 27 to the solidifying means 47, described below. The launder 31 is movable by suitable means, not illustrated, such as a sliding type hydraulically operated mechanism, out of the port 16 and into the region 13, to the position shown by the dotted lines. This permits the gate valve 17 to move across the port 16 and close the port.

As previously indicated, the flow of hot material over a transfer structure, such as a launder or tundish, can result in a significant amount of erosion of the bed of the transfer structure. Erosion problems are particularly prevalent in the processing of steel, especially of high alloy contents. Frequent replacement of the transfer structures because of excessive erosion can result in high cost of equipment and an excessive amount of down time. To prevent such erosion, the transfer structures as used in the apparatus of the invention are cooled.

In the illustrated embodiment, cooling of the launders 31 and 43 is accomplished by providing passages 48 and 49 therein, respectively, through which a suitable coolant, such as water, is circulated. Due to the cooling of the transfer structures, a skull or layer 51 of solidified metal forms between the molten metal 27 and the launders 31 and 43. This skull, being of the same material as the molten metal, does not contaminate the molten metal. Moreover, any erosion of the skull 51 is constantly replaced by solidifying molten metal. Accordingly, the material of which the launders 31 and 43 are made may be a convenient metal such as copper, and the launders need not be provided with relatively expensive refractory material liners. The skull thickness depends on the amount of heat removed from the transfer structure relative to the temperature and quantity of the molten material passing thereacross. With proper regulation, the amount of heat removed may reach a desired equilibrium with that added to maintain a constant skull thickness.

In order to insure that a free flow of molten material across the transfer structure is maintained, the molten material is constantly heated while on the launders 31 and 43 by means of a plurality of electron beams 52. The electron beams are produced by a plurality of electron guns 53, suitably mounted by means, not illustrated, within the vacuum enclosure. The guns 53 may be of any type for producing a desired level of electron beam heating, many types of such guns being well known in the art.

In the apparatus illustrated in FIG. 1, the soldifying means 47 are for teeming ingots at a high production rate. A mold tunnel 54 communicates with the region 13 of the enclosure 11 and extends on either side thereof (extending perpendicularly of the paper ih FIG. 1). The mold tunnel 54 is, accordingly, evacuated by the pump 23 through the duct 22. Two ledges 55 are provided along the sides of the mold tunnel and support a pair of parallel tracks 56. The tracks extend along the sides of the mold tunnel a distance above the floor thereof and support a ladle car 57, guiding the wheels 58 thereof. A ladle 59 is supported by the ladle car 57 and is able to travel the length of the mold tunnel 54 with the car 57. The ladle 59 includes a refractory material liner 60 and a bottom spout 61 in which a refractory plug 62 is disposed. A refractory rod 63 extends upwardly from the plug 62 above the ladle 59 and may be drawn upwardly by suitable means, not illustrated, to remove the plug 62 from the spout 61 when it is desired to pour molten metal 27 from the ladle 59.

A further pair of tracks 64 are disposed along the sides of the mold tunnel 54 at the floor thereof. A mold car 66 is supported and guided on the tracks 64 by wheels 67. A plurality of molds 68 are placed on the mold car 66 for teeming ingots. An arrangement of tundishes 69 is provided for directing molten material poured from the ladle 59 to the various molds 68. The tundishes 69 are supported by a suitable structure 71 from the mold car 66. Alternatively, the tundishes may be supported on the car 57 and may be of a configuration to carry molten metal directly from the launder 43 to the molds distributed in the mold tunnel 54.

In either the illustrated case, or the alternative mentioned above, the tundishes 69 are provided with coolant passages 72 therein for removing heat from the tundishes. Accordingly, a skull is formed similar to the skull 51 on the launders 31 and 43 to prevent erosion of the tundishes and to prevent contamination of the molten metal. To maintain the flow of the molten metal on the tundishes 69, electron beam guns 73 are provided. The guns direct electron beams 74 on the surface of the molten metal as it passes over the tundishes 69.

The foregoing described apparatus may be constructed on a scale capable of solidifying very large quantities of metal at high rates and in complete vacuum. For example, apparatus of the type described, built to the proper scale, is capable of processing nickel base alloy at rates as high as 15 tons during a 2-hour melt period. Rates as high as 30 tons every 3 hours are feasible. The two separate regions 12 and 13 of the vacuum enclosure 11 can be evacuated or brought to atmospheric pressure independently. Accordingly, filled molds can be cooling in a vacuum environment while the crucible 24 is being recharged or sculled after a heat. Conversely, the molten metal may be treated in the crucible 12 in a vacuum environment while the region 13 is brought to atmospheric pressure in order to remove molds from the mold tunnel or for purposes of refractory preparation in the ladle 59. Erosion problems in the launders 31 and 43 and in the tundishes 69 are non-existent. Moreover, lower superheat is necessary, since heat is continuously added to the metal as it flows over the transfer structures. For example, only about ⅓ to ½ the superheat may be required in many cases. Not only does lower superheat improve overall efficiency, but less erosion of refractory material occurs in the ladle and crucible. In addition, because of lower superheat, less time is required in the crucible, improving the through-put.

Figure 2:
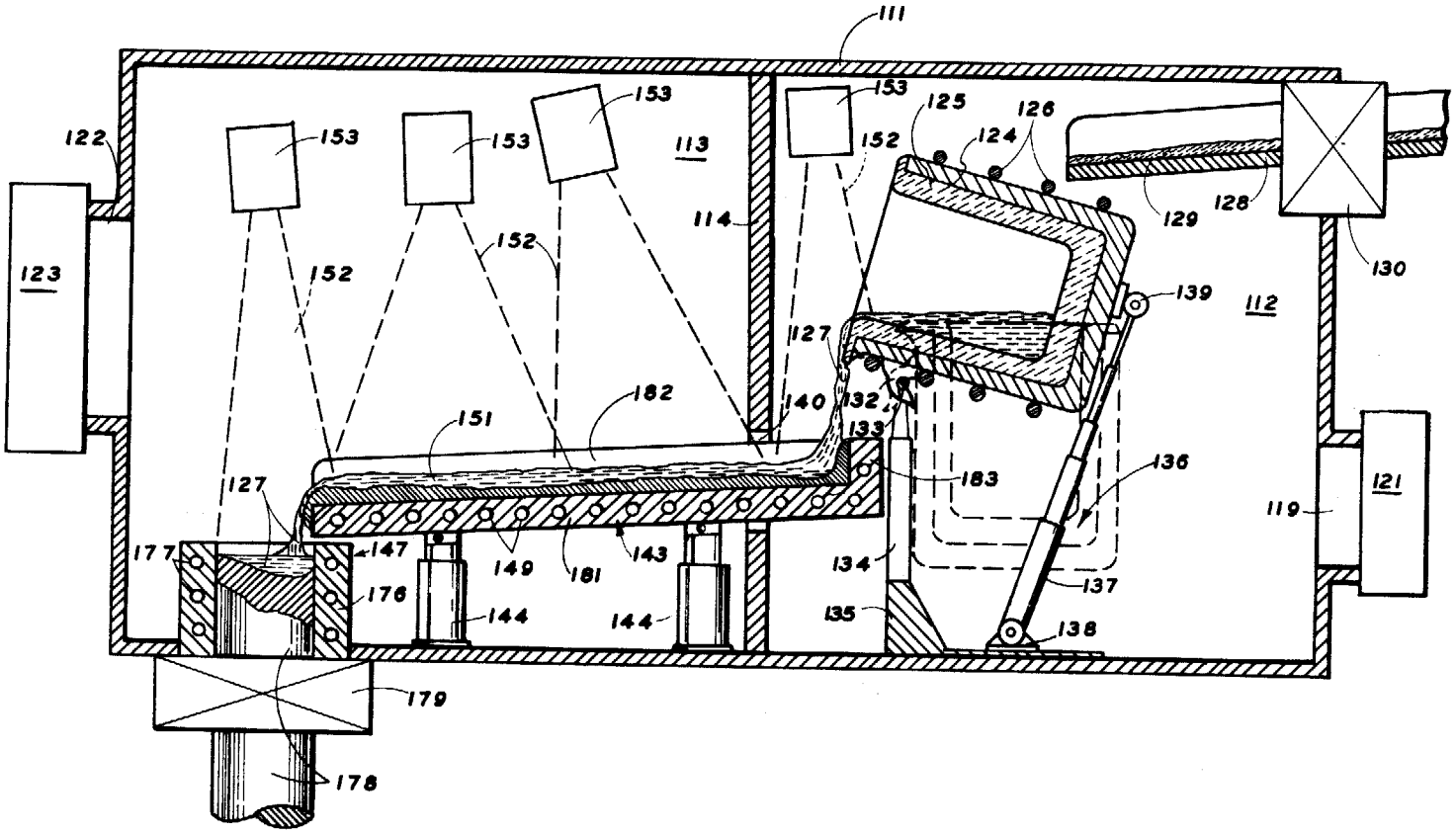
FIG. 2 is a schematic side view, partially in section, illustrating another embodiment of the invention.

The apparatus of the invention is also of advantage in systems where pouring rates are much slower than teeming and similar operations. In the apparatus illustrated in FIG. 2, items with similar functions to items in FIG. 1 have been given reference numbers in which the last two numerals are identical and in which the first numeral is a 1. In FIG. 2, the solidifying means 147 are for accomplishing continuous casting of the molten material and comprise a cylindrical mold 176 having suitable passages 177 formed therein for cooling the walls of the mold. As the material solidifies in the mold 176, the resultant solidified product (consisting of a round or rod shaped ingot 178) is moved downwardly by suitable means, not illustrated, through a vacuum valve 179 in a wall of the enclosure 111. Although the foregoing described continuous casting means are of particular advantage in a system of the type described, other solidifying means may be used within the scope of the invention. Such means may include molds of various shapes and types, splash plates (for particle formation), etc.

The transfer structure 143 is a hearth for slow pouring and includes a bed 181 and side walls 182 for confining the molten material on the bed. An end wall 183 is provided to insure that the flow of molten material is downward along the gradually slanting bed to the solidifying means. The hearth extends through an opening 140 in the wall 114. Although no gate is provided for closing the opening 114, some pressure differential may be maintained between the two chambers 112 and 113 if desired. Because of the isolation between the two chambers provided by the wall 114, the large amounts of gases which evolve during melting and pouring in the chamber 112 are segregated from the chamber 113 to enhance purification as described below. The hearth is provided with adjustable hydraulic supports 144 which extend upwardly from the floor of the enclosure 111. The tilt of the hearth 143 may be regulated by adjusting the supports 144 to facilitate the metering of the flow into the continuous casting means 147. Thus, for example, the hearth may be tipped repeatedly to cause intermittent flow of molten metal for casting a succession of discrete items. Moreover, the tilt of the hearth may be changed as desired to vary the casting rate in continuous casting operations. In addition, if it is desired to process a metal after first processing a different kind of metal, the hearth may be easily cleaned and prepared for the different metal without having to bring the chamber to atmospheric pressure. This may be done by tilting the hearth and reducing the cooling rate enough that the skull melts and runs off the hearth.

As previously indicated, the flow of hot metal over a transfer structure, such as a launder or hearth, can result in a significant amount of erosion of the bed of the transfer structure. Frequent replacement of the transfer structures because of excessive erosion can result in a high cost of equipment and an excessive amount of down time. To prevent such erosion the hearth used in the apparatus of FIG. 2 is cooled. At the same time, the temperature of the molten material thereon is maintained at a desired temperature, as explained below.

In the illustrated embodiment, cooling of the transfer structure is accomplished by providing the hearth 143 with passages 149 therein through which a suitable coolant, such as water, is circulated. Due to the cooling of the hearth, a skull or layer 151 of solidified molten metal forms between the molten metal 127 and the transfer structure. The material of which the transfer structure is made may, accordingly, be a convenient metal such as copper, and the transfer structure need not be provided with a relatively expensive refractory material liner. Moreover, the skull, being of the same material as the molten metal, does not contaminate the molten metal. The skull thickness depends upon the amount of heat removed from the transfer structure relative to the temperature and quantity of the molten metal passing thereacross.

In order to insure that a free flow of molten metal across the hearth 143 occurs, and to insure sufficient superheat for volatilization of impurities, the surface of the molten metal on the hearth is heated by electron beams 152. The electron beams are produced by a plurality of electron guns 153 suitably mounted by means, not illustrated, within the vacuum enclosure 111. The guns 153 may be of any suitable type for producing a desired level of electron beam heating, many types of such guns being well known in the art. The beam impact pattern on the metal is selected to produce thermal gradients and induce agitation of the molten metal on the hearth. This insures maximum exposure of the molten metal to the vacuum, to draw off volatile impurities. The beams also strike the molten top of the ingot 78 to help form smooth sides and to cause lighter solid impurities to float on the top and not be frozen into the ingot. An additional gun 153 is disposed in the chamber 112 to provide an electron beam 152 for heating the lip region of the crucible 124 as the molten metal 127 is poured into the hearth.

Because of the degree of purification attainable in the apparatus of FIG. 2, a vacuum arc re-melt operation for the purpose of getting rid of slags, etc., as is sometimes required in the vacuum induction processing of high alloy steels, is unnecessary. Even at relatively high pressures within the enclosure 11, that is, pressures of the order of $10^{-2}$ to $10^{-1}$ Torr, sufficient purification may be obtained in one stage of vacuum induction melting that a re-melt operation is not required. This is particularly true for metals and alloys for which a high degree of purification is often not required, such as super alloy steels and high alloy tool steels. The invention, however, is not limited to such materials.

When the area of the hearth is made great enough to allow exposure of the molten material to the vacuum environment at a rate of about 300 to 200 pounds per hour per square foot of hearth, significant amounts of volatile impurities may be removed. The invention, however, is not limited to such an exposure rate, since purification is merely one of several advantages flowing from the invention. Depending upon the scale of operation, the electron beam heating requirement in order to make up heat losses to a cold hearth and to the vacuum environment, may be in the range of 20 to 50 kilowatts per square foot of hearth.

The heath may be used in a two region system as shown in FIG. 1. In such as case, the hearth may be positioned as is the launder 43. Where hearth volume is sufficient, pouring may continue in the region 13 while the region 14 is brought to atmospheric pressure for recharging.

Figure 3:
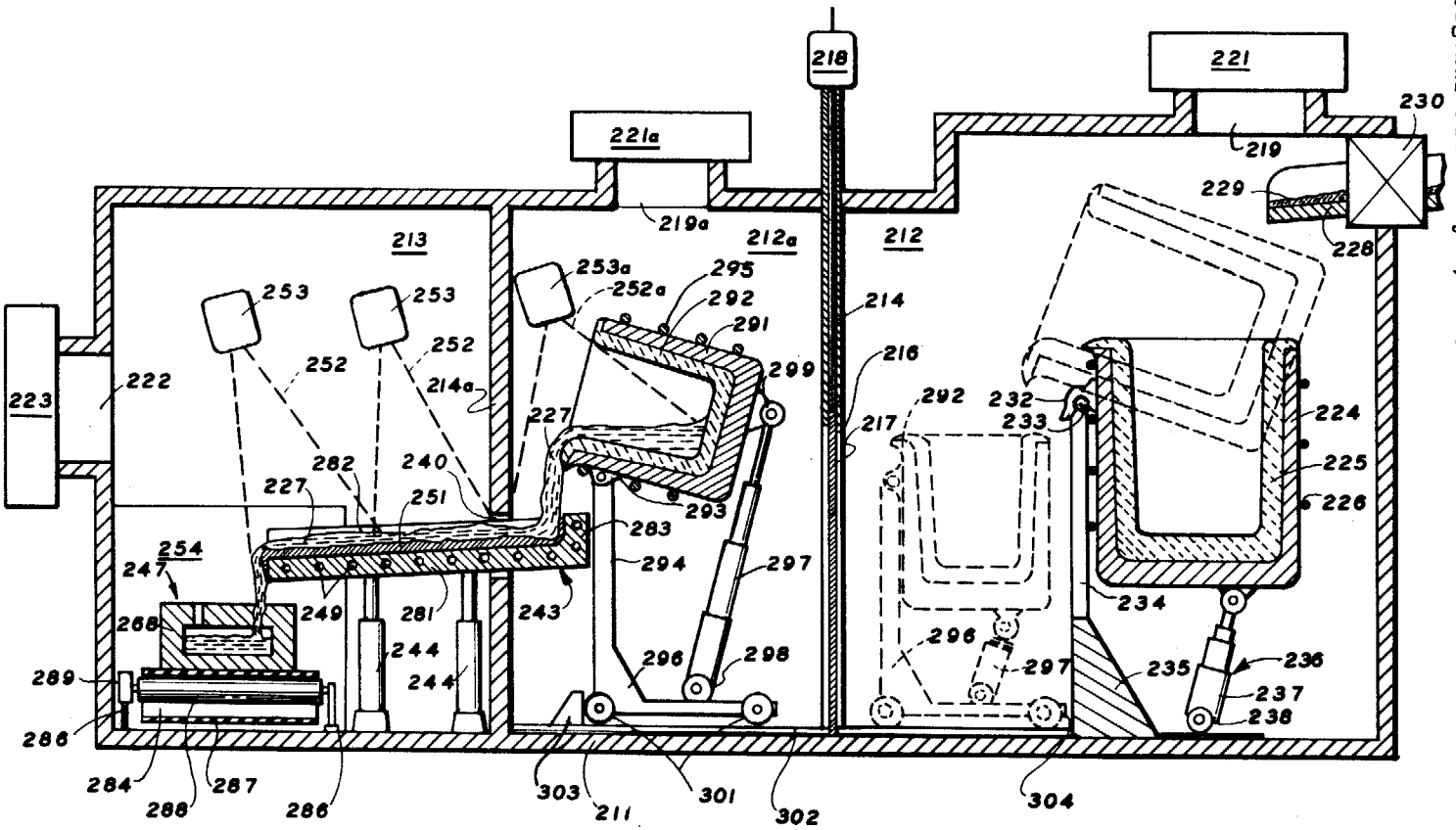
FIG. 3 is a schematic side view, partially in section, illustrating still another embodiment of the invention.

In FIG. 3, a further embodiment of the invention is illustrated. Items with functions similar to items in the previous two described embodiments have been given reference numbers in which the last two numerals are identical to the corresponding item and in which the first numeral is a 2. The embodiment of FIG. 3 utilizes a movable tilt pour ladle 291 as the first stage of a two-stage transfer structure (the second stage of which is a hearth 243) between the melt crucible 224 and the solidifying means 247. An intermediate chamber 212a is provided defined between walls 214 and 214a. The chamber 212a is evacuated through a duct 219a by a vacuum pump 221a. An electron beam gun 253a is provided in the chamber 212a for heating the molten metal 227 by means of an electron beam 252a.

In the embodiment of FIG. 3, the solidifying means 247 are for accomplishing teeming of ingots and comprise one or more molds 268. A mold tunnel 254 extending in the manner of the mold tunnel 54 in FIG. 1 includes belt type conveyor apparatus 284 comprising supports 286, an endless belt 287, and a series of supporting rollers 288. The belt is driven on the rollers by suitable means such as a drive chain, not illustrated, contained in a housing 289. The molten metal 227 is poured into the molds 268 from the hearth 243 similar to the hearth 143 in FIG. 2. The hearth is adjustable by hydraulic lifts 244 to start and stop pouring as desired for teeming the ingots. Accordingly, successive molds may be positioned to receive molten metal from the hearth by operating the conveyor system 284. Molten metal on the hearth is heated from the electron beam guns 253.

In the embodiment of FIG. 3, the molten metal is not poured directly into the hearth from the crucible 224, as was the case in the embodiment of FIG. 2, but rather an intermediate transfer structure is utilized. This intermediate transfer structure comprises the tilt pour ladle 291 having a refractory material liner 292. The ladle is pivotally supported by a bracket 293 on an upright 294 extending from a ladle cart 296. Tilting of the ladle 292 is accomplished by a hydraulic lift 297 having one end pivotally secured to a bracket 298 on the cart 296 and having the other end pivotally secured to a bracket 299 on the bottom of the ladle 291.

The cart 296 moves between the chambers 212 and 212a through the opening 216 in the wall 214, being guided in its movement by wheels 301 which ride on suitable tracks 302 secured to the bottom of the enclosure 211. Stops 303 and 304 are provided at each end of the tracks 302 to stop the cart 296 in the appropriate position for the operations subsequently described. Movement of the cart is effected by suitable means, not illustrated, such as cables or chain drives. The extreme ends of the movement of the cart are illustrated by the solid lines in the chamber 212a and by the dotted lines in the chamber 212. Naturally, the gate 217 must be raised to permit passage of the cart and ladle between the chambers.

When the cart and ladle 292 are positioned in the chamber 212, the crucible 224 may be tilted by the hydraulic mechanism 236 to pour molten material into the ladle. The ladle may then be moved through the opening 216 into the chamber 212a and tilted to the position shown in solid lines to pour the molten material 227 into the hearth 243. During the latter pouring operation, the gate 217 may be closed to prevent vapors and gases evolved from the relatively impure melt in the crucible 224 from affecting the purification process in the hearth 243. The gate 217 may also be closed while pouring molten material into the ladle 292, if desired.

The crucible 224 may be made about three times the volume of the ladle 292 in order to accommodate froth and various other products of the melting operation. If faster pouring is desired, a launder may be substituted for the hearth 243. The electron beam gun 253a aids in making up any heat losses in the molten metal while contained in the ladle 291. As an alternative, the ladle may be provided with an induction heater coil *295* and suitable trailing cables (not shown) to maintain a desired temperature in the molten metal while in the ladle.

In operating the apparatus illustrated in FIG. 3, typical pressure may be as follows: 1 atmosphere to 10 microns in chamber 212; 10 microns to 1 micron in the chamber 212a; and less than 1 micron in the final chamber 213. Because heat losses may be made up by electron beam heating during slow pouring, excessive superheat need not be attained in the crucible 224. Accordingly, the metal in the ladle 291 may be at a relatively lower temperature and less wear to the refractory results. Moreover, because froth and similar products are easily retained in the crucible 224 and because no frothing need occur in the ladle 291, a further reduction in wear to the refractory liner 292 of the ladle results. The advantages of less refractory wear are magnified since, because of the economic factors involved, less refractory wear may permit the use of more expensive and better refractory materials, further reducing refractory wear.

Figure 4:
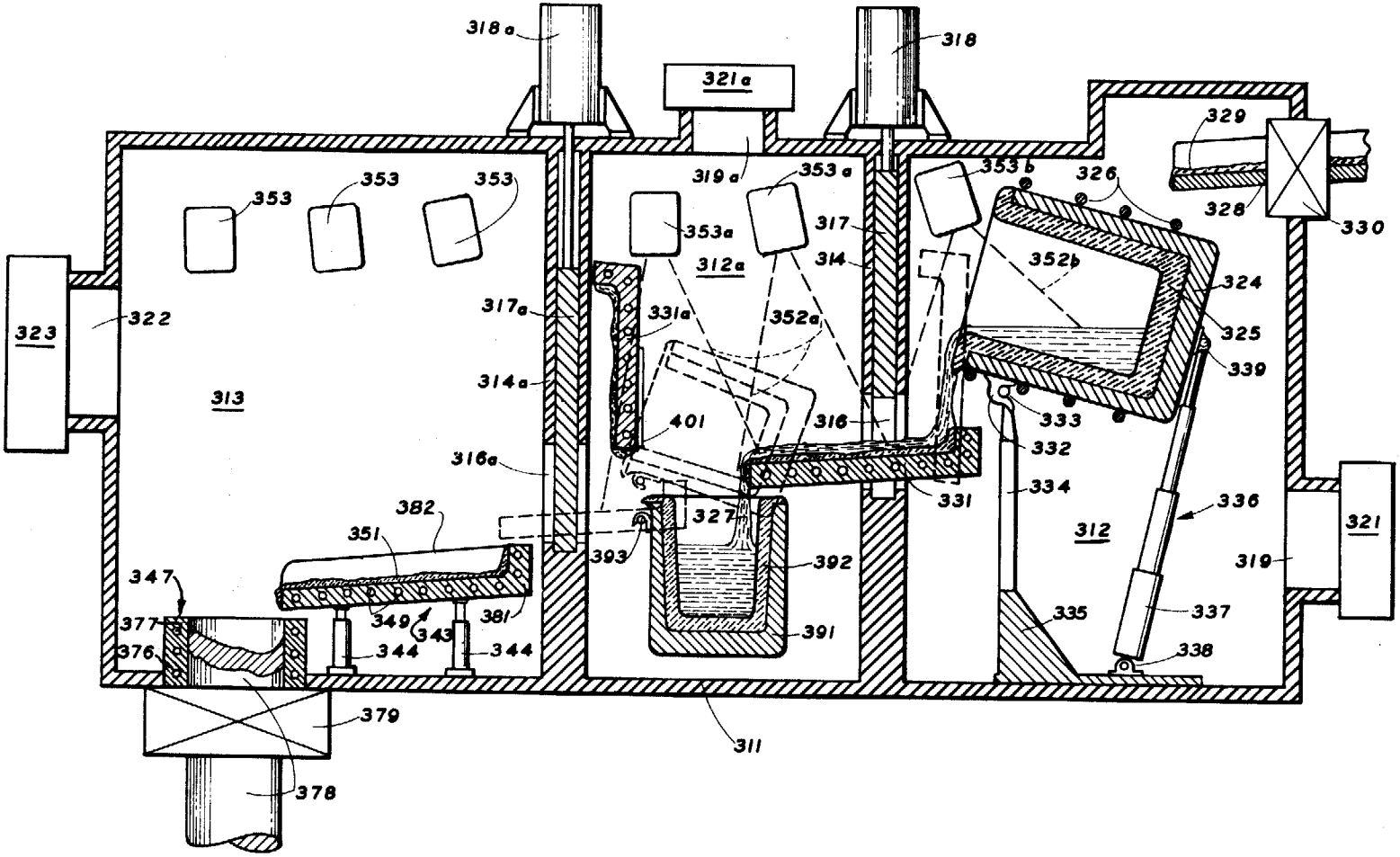
FIG. 4 is a schematic side view, partially in section, illustrating a further embodiment of the invention.

In FIG. 4, a further embodiment of the invention is illustrated. Items with functions similar to items in the previous three described embodiments have been given reference numbers in which the last two numerals are identical to the corresponding item and in which the first numeral is a 3. The embodiment of FIG. 4 uses a four-stage transfer structure between the melt crucible 324 and the solidifying means 347. The four stages of the transfer structure are a launder 331, an intermediate tilt pour ladle 391, a further launder 331a and a hearth 343. An intermediate chamber 312a is provided defined between walls 314 and 314a. The chamber 312a is evacuated through a duct 319a by a vacuum pump 321a. Two electron beam guns 353a are provided in the chamber 312a for heating the molten metal 327 by means of electron beams 352a.

In FIG. 4, the solidifying means 347 are for accomplishing continuous casting of the molten material and are identical with the solidifying means illustrated in FIG. 2. If desired, a vacuum enclosure (not shown) contiguous with the chamber 313 may be provided for retaining the continuous cast ingot in a vacuum environment. The unillustrated contiguous vacuum enclosure may include means for conditioning the surface of the cast ingot prior to its removal from the vacuum environment through a suitable lock, also not illustrated.

The chambers 312, 312a and 313 may be completely isolated from each other by the gates 317 and 317a, controlled by the actuators 318 and 318a, respectively. The launders 331 and 331a are movable into and out of the openings 316 and 316a (as illustrated in phantom) by suitable means, now shown. This permits closure and sealing of the openings. The launder 331 is shown in place for passing molten material between chambers, whereas the launder 331a is shown in a stored position with the opening 316a closed. Molten material is transferred from the crucible 324 to the crucible 391 by the launder 331.

The ladle 391 is of the tilt pour type and may be displaced vertically by a suitable hoist, not shown, in a vertical guide 401. A further chain or other suitable means (not shown) is provided for tilting the ladle 391 into the dotted position when raised to pour molten material therefrom into the launder 331 when the launder is positioned properly, as indicated by the dotted lines.

In operating the apparatus illustrated in FIG. 4, slow pouring into the hearth 343 from the ladle 391 may be accomplished while the crucible 324 is being re-charged or while the chamber 312 is brought to atmospheric pressure for preparation of the refractory material therein. Moreover, a sufficient inventory of molten material in the hearth may allow uninterrupted continuous casting while the gate 317a is closed and the ladle 391 returned to its lower position for refilling. The ability to completely isolate the chamber 313 from the chamber 312 at all times insures that such vapors and gases will not interfere with the purification process in the hearth 343. Isolation may also be attained between the two chambers 312 and 312a to avoid contamination of the material in the ladle 391 and to prevent vapors and gases evolved from the relatively impure melt in the crucible 324 from re-contaminating the molten material in the ladle 391. Thus, the apparatus of FIG. 4 facilitates a reasonably continuous type of operation, since slow pouring over the hearth may occur simultaneously with the melting of feed material in the crucible 324.

It may therefore be seen that the invention provides improved method and apparatus for producing a solid metal product. The invention effects a minimization of the wear of transfer structures utilized in vacuum induction heating and casting processes. Moreover, a significantly higher degree of purification is attainable in accordance with the invention that has been heretofore attainable in vacuum induction melting operation. All the economic advantages of vacuum induction processing are retained with the additional advantages of low contamination, low refractory wear, and the elimination of the need for high levels of superheat in the crucible to maintain sufficient fluidity throughout the process.

Various modifications of the invention will become apparent to those skilled in the art from the foregoing description and accompanying drawings. Such other modifications are intended to fall within the scope of the appended claims.

What is claimed is:

1. Apparatus for producing a solid metal product, including in combination, a vacuum enclosure, means for evacuating said vacuum enclosure, a heating crucible positioned within said enclosure and adapted to contain molten metal, a first transfer stage including a [movable] ladle adapted to be filled by said crucible, means for pouring molten metal from said crucible into said ladle, a second transfer stage adapted to receive molten metal from said ladle, means for cooling said second transfer stage to form a solid skull between the molten metal and said second transfer stage, at least one electron beam gun for heating the molten metal in said second transfer stage, and means at the opposite end of said second transfer stage from said ladle for solidifying the molten metal to form a solid metal product.

2. Apparatus according to claim 1 wherein said vacuum enclosure is divided into first, second and third regions, wherein said crucible is disposed in said first region, wherein said solidifying means are disposed in said third region, wherein said [movable] ladle is adapted to move between said first and second regions, and wherein said second stage extends between said second and third regions, means for sealing said first region from said second region, said evacuating means being adapted to maintain each of said regions in an evacuated condition.

3. Apparatus according to claim 1 wherein said second stage comprises a hearth.

4. Apparatus according to claim 1 wherein said vacuum enclosure is divided into first, second and third regions, wherein said crucible is disposed in said first region, wherein said solidifying means are disposed in said third region, wherein said [movable] ladle is disposed in said second region, wherein said first stage further includes a first launder which extends between said first and second regions, and wherein said second stage of said transfer structure comprises a second launder adapted to receive molten metal from said ladle and extending between said second and third regions, said first launder and said second launder each being movable to a non-operating position, means for sealing said first region from said second region with said first launder in the non-operating position, and means for sealing said second region from said third region with said second launder in the non-operating position, said evacuating means being adapted to individually maintain each of said regions in an evacuated condition when sealed.

5. Apparatus according to claim 4, wherein said second stage further comprises a cooled hearth adapted to receive molten metal from said second launder.

6. Apparatus according to claim 1 wherein said transfer structure includes a tilted hearth, and comprising means for varying the angle of tilt of said hearth for regulating the flow of molten metal thereon.

7. Apparatus according to claim 6 wherein said varying means include at least one hydraulically adjustable support.

8. Apparatus according to claim 1 wherein said vacuum enclosure is divided into first, second and third regions, wherein said crucible is disposed in said first region, wherein said solidifying means are disposed in said third region, wherein said [movable] ladle is disposed in said second region, wherein said first transfer stage includes a launder which extends between said first and second regions, said launder being movable to a non-operating position, means for sealing said first region from said second region with said launder in the non-operating position, said second transfer stage comprising a cooled hearth adapted to receive molten metal from said ladle.

*9. Apparatus for the vacuum melting, refining, and casting of metal to form a solid metal product, including in combination, an induction heated vacuum melting furnace for melting metal in a vacuum, an induction heated transfer ladle for holding molten metal received from said melting furnace, a refining hearth for receiving molten metal from said transfer ladle, enclosure means for maintaining said transfer ladle and said hearth in a vacuum electron beam heating means for heating in a vacuum the molten metal flowing over said hearth, and vacuum casting means for receiving and solidifying in a vacuum molten metal which has passed over said vacuum refining hearth.*

*10. Apparatus according to claim 9 including means for cooling said hearth to form a skull of solid metal underlying the flowing molten metal.*

*11. Apparatus according to claim 9, in which a vacuum valve is provided for isolating said melting furnace from the transfer ladle.*

References Cited

The following references, cited by the Examiner, are of record in the patented file of this patent or the original patent.

UNITED STATES PATENTS

| | | | |
|---|---|---|---|
| 2,983,973 | 5/1961 | Parlonti | 164—138 X |
| 3,014,255 | 12/1961 | Bussard et al. | 164—251 X |
| 3,157,922 | 11/1964 | Gruber | 164—250 X |
| 3,187,565 | 5/1965 | Taylor | 164—65 X |
| 3,304,587 | 2/1967 | Hov | 164—61 X |
| 3,342,250 | 9/1967 | Treppschuh et al. | 164—50 |
| 3,396,778 | 8/1968 | Jensen et al. | 164—49 |

FOREIGN PATENTS

| | | | |
|---|---|---|---|
| 204,711 | 8/1959 | Austria | 164—258 |
| 1,184,785 | 1/1965 | Germany | 266—34 V |
| 290,817 | 6/1965 | Netherlands | 164—258 |
| 414,955 | 12/1966 | Switzerland | 164—61 |

R. SPENCER ANNEAR, Primary Examiner

U.S. Cl. X.R.

164—64, 258, 337